No. 848,132. PATENTED MAR. 26, 1907.
C. P. E. SCHNEIDER & E. RIMAILHO.
THEODOLITE OR SIMILAR INSTRUMENT.
APPLICATION FILED AUG. 21, 1906.
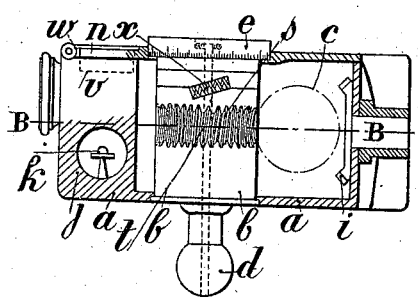
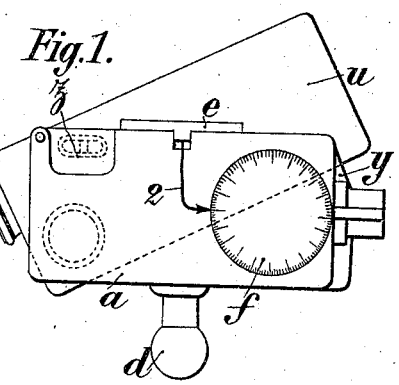
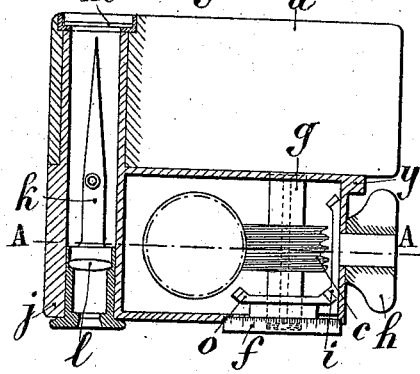
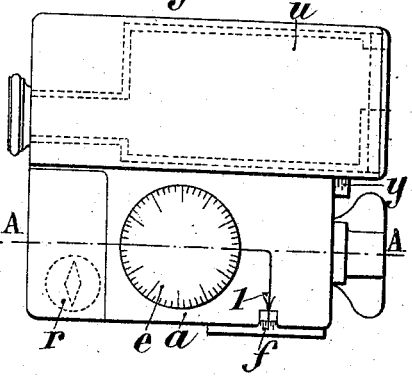

UNITED STATES PATENT OFFICE.

CHARLES PROSPER EUGÉNE SCHNEIDER, OF LE CREUZOT, AND EMILE RIMAILHO, OF NEUILLY-SUR-SEINE, FRANCE.

THEODOLITE OR SIMILAR INSTRUMENT.

No. 848,132.

Specification of Letters Patent.

Patented March 26, 1907.

Application filed August 21, 1906. Serial No. 331,483.

*To all whom it may concern:*

Be it known that we, CHARLES PROSPER EUGÉNE SCHNEIDER and EMILE RIMAILHO, residing, respectively, at Le Creuzot, Saône et Loire, France, and at 54 Boulevard Maillot, Neuilly-sur-Seine, Seine, France, have invented a new and useful Improvement in or Relating to Theodolites or Similar Instruments, which is fully set forth in the following specification.

The present invention has for its object a field-theodolite which although very small in bulk and easily transportable constitutes an instrument of great precision for the measurement of azimuthal and zenithal and bearing or direction angles relatively to the magnetic north.

In carrying out reconnaissances, surveying, or like operations in connection with tracts of country it is necessary for the surveyor or officer, for example, to measure azimuthal and zenithal angles, for which purpose an instrument of great precision and capable of being readily transported by a horseman is required.

The apparatus hereinafter described is designed with the object of fulfilling these conditions, and, further, to permit either of taking bearings with precision on the magnetic north or of measuring distances.

A theodolite constructed according to this invention is represented in detail in the accompanying drawings, in which—

Figure 1 is a side elevation. Fig. 2 is a longitudinal section on the line A A of Figs. 3 and 4. Fig. 3 is a horizontal section on the line B B of Fig. 2. Fig. 4 is a plan view. Figs. 5 and 6 are diagrams illustrating methods of employing the apparatus.

The apparatus is constituted in principle by a supporting or containing box $a$ for the sighting and observing parts, the box being adapted for receiving a rotary movement about a rod $b$, which traverses the said box. For this purpose the surface of the said rod $b$ is cut in the form of a tangent screw-wheel, which is divided into two parts $s\ t$ to enable play of the parts to be taken up, a spring $x$ serving to insure the alinement of the said parts. Movement of rotation is given to this tangent-wheel by means of a screw $c$ on a spindle $g$, carried by the box $a$.

If the rod $b\ s\ t$ be supported by an external projection—such as that indicated at $d$, for example—and if the screw $c$ be actuated directly or by means of a handle $h$, mounted in a part of the box and carrying the pinion $i$, which meshes with the pinion $o$, keyed upon the spindle $g$, which carries the screw $c$, the box $a$ will be caused to rotate about the rod $b$ and the amplitude of this movement may be determined by means of graduated circles $e$ $f$, respectively, carried by the rod $b$ and the spindle $g$ of the screw $c$.

In the constructional form represented the projection $d$ of the rod $b$ carries a spherical head, which may be mounted upon a tripod $p$ by the intermediary of a ball-and-socket joint $q$, Figs. 5 and 6. A part of the box $a$ forms a sleeve $j$, parallel with the spindle $g$, for the reception of a magnetized declination-needle $k$, and it is this sleeve (at the respective extremities of which there are arranged an eyepiece and a lens $l$ and a ground glass $m$, provided with a guide-mark) which serves as the axis of rotation for a powerful prismatic telescope $u$ (magnifying largely) and of small length, provided internally with a micrometer. It follows from this construction that the telescope $u$ participates in the movements of rotation of the box $a$ around the rod $b\ t\ s$ and that it is also able to turn in a plane parallel with the axis of rotation of the said box, moving in front of a graduated scale $y$, carried by the box $a$, which permits of reading the value of its inclination to the horizon.

The apparatus is completed by two levels $n$ and $z$ and a compass $r$, arranged in a recess $v$ of the box $a$ and covered with a hinged lid $w$.

The theodolite described may be employed in the following connections: (*a*) as a means of measuring the horizontal angle comprised between the planes of direction of two objects situated at different heights; (*b*) as a means of measuring the horizontal angle comprised between the plane of direction of an object and the vertical plane passing through the theodolite and the magnetic north; (*c*) as a means of measuring the angle above or below the horizon made by a line proceeding from the theodolite and terminating at any desired point; (*d*) as a means of measuring the distance of a distant point by the employment of two theodolites and of an appropriate calculation-circle. The theodolite being placed upon its support, Fig. 5, the axis of the rod $b$ is at first rendered vertical by the rotation of the ball-and-socket joint by bringing the bubble of the spherical level *n* to the center of this level. If the operating-handle *h* be rotated, the telescope *u* will rotate with the box *a* around this vertical axis. It is directed toward a first object, and the telescope is inclined around its axis of rotation in order to direct it onto the object situated either above or below the horizon. The angle made by the axis of the telescope with the horizontal is then read on a graduated scale *y*. The telescope being directed onto an object, the graduations of the upper disk *e* and of the lateral disk *f* define this direction, starting from the zero of the graduations, by a certain number. For example, the upper disk is divided into sixty parts, each equivalent to one hundred units and numbered "0," "100," "200," "5900." The lateral disk is divided into one hundred parts, numbered "0," "1," "2," "99." The index 1 of the upper disk being brought to rest between "4200" and "4300," the index 2 of the lateral disk being brought to rest at "75," the direction of the telescope will be defined by the figure "4275." As soon as the lateral disk *f* is caused to rotate through a division the telescope *u* rotates around the rod *b*, and the fresh direction is defined by the figure "4276" or "4274," according to the amount or direction of rotation. Further, the unit of measurement being one six-thousandth of the circumference, the arc described by a point of the axis of the telescope *u* in order to pass from the origin of the directions to the division "4275" has for its value four thousand two hundred and seventy-five six-thousandths of the circumference. The angle of rotation of the telescope has thus been measured. This operation may be repeated in succession for all the points situated around the vertical axis of the theodolite and define the direction of each of them and measure the angles comprised between these directions. Among these points it may be desirable to define that which is in the direction of the magnetic north. In this case the theodolite should be rotated until the magnetized needle *k* is in equilibrium in front of a guide-mark carried by the ground glass *m*. It is directed to the north, and the telescope *u*, which is fixed at ninety degrees to the right of the axis of the needle, is directed to the east. As, further, the graduated disks *e f* are movable with slight friction on the rods *b* and *g*, respectively, the instrument may at this moment be caused to mark zero, and all the subsequent displacements of the telescope will be measured from a fixed origin obtained by directing the instrument to the magnetic north.

If the theodolite is arranged as indicated in Fig. 6, its axis of rotation *b* having become horizontal the box *a* moves in a vertical plane, and its rotation and that of the telescope are always recorded by the graduated disks *e f*. As the lateral face, which is now above, carries a level *z*, fixed parallel with the axis of the telescope, means are available for rendering the axis of the telescope horizontal. The indexes 1 and 2 are then caused to mark zero. If the telescope *u* is then inclined upward or downward, the angle through which it has turned from the horizontal is registered by the graduations of *y*.

What I claim, and desire to secure by Letters Patent of the United States, is—

1. In a theodolite or similar instrument, the combination of a supporting-box provided with sighting and directing parts, a rod provided with a two-part tangent screw-wheel, an operating-screw engaging said wheel for rotating said box, said rod and operating-screw carrying graduated scales to serve for indicating the amplitude of the movement of rotation.

2. In a theodolite or similar apparatus the combination of a telescope, a supporting-box and a sleeve formed therewith and adapted for containing a magnetized declination-needle, the said sleeve serving as the axis of rotation for the sighting-telescope, substantially as hereinbefore described for the purposes specified.

3. In combination, a spring-pressed two-part shaft having a two-part tangent screw-thread, a box or casing revolubly mounted on said shaft and provided with a telescope, and a drive-shaft having a worm-gear engaging said first shaft for rotating said casing.

In testimony whereof we have signed this specification in the presence of two subscribing witnesses.

CHARLES PROSPER EUGÉNE SCHNEIDER.
EMILE RIMAILHO.

Witnesses:
EUGÉNE EHASSEE,
PIERRE GABON.